(12) United States Patent
Jaleel et al.

(10) Patent No.: US 8,769,209 B2
(45) Date of Patent: Jul. 1, 2014

(54) METHOD AND APPARATUS FOR ACHIEVING NON-INCLUSIVE CACHE PERFORMANCE WITH INCLUSIVE CACHES

(75) Inventors: Aamer Jaleel, Cambridge, MA (US); Simon C. Steely, Jr., Hudson, NH (US); Eric R. Borch, Fort Collins, CO (US); Malini K. Bhandaru, Sudbury, MA (US); Joel S. Emer, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 12/973,051

(22) Filed: Dec. 20, 2010

(65) Prior Publication Data

US 2012/0159073 A1 Jun. 21, 2012

(51) Int. Cl.
*G06F 12/12* (2006.01)
(52) U.S. Cl.
USPC .......................... 711/134; 711/122; 711/133
(58) Field of Classification Search
None
See application file for complete search history.

(56) References Cited

U.S. PATENT DOCUMENTS

| | | | | |
|---|---|---|---|---|
| 6,000,015 A | * | 12/1999 | Whittaker | 711/134 |
| 6,446,166 B1 | * | 9/2002 | Arimilli et al. | 711/122 |
| 7,277,992 B2 | * | 10/2007 | Shannon et al. | 711/141 |
| 7,577,793 B2 | * | 8/2009 | Borkenhagen et al. | 711/133 |
| 7,669,009 B2 | * | 2/2010 | Kottapalli et al. | 711/122 |

* cited by examiner

*Primary Examiner* — Gary Portka
(74) *Attorney, Agent, or Firm* — Blakely, Sokoloff, Taylor & Zafman LLP

(57) ABSTRACT

An apparatus and method for improving cache performance in a computer system having a multi-level cache hierarchy. For example, one embodiment of a method comprises: selecting a first line in a cache at level N for potential eviction; querying a cache at level M in the hierarchy to determine whether the first cache line is resident in the cache at level M, wherein M<N; in response to receiving an indication that the first cache line is not resident at level M, then evicting the first cache line from the cache at level N; in response to receiving an indication that the first cache line is resident at level M, then retaining the first cache line and choosing a second cache line for potential eviction.

19 Claims, 14 Drawing Sheets

*Query Based Selection*

Early Core Invalidation

Temporal Locality Hints

*Query Based Selection*

US 8,769,209 B2

METHOD AND APPARATUS FOR ACHIEVING NON-INCLUSIVE CACHE PERFORMANCE WITH INCLUSIVE CACHES

BACKGROUND

1. Field of the Invention

This invention relates generally to the field of computer processors. More particularly, the invention relates to an apparatus and method for achieving non-inclusive cache performance with inclusive caches.

2. Description of the Related Art

As chip-level multiprocessing (CMP) becomes widespread and the gap between processor and memory speeds continues to widen, it is imperative that processor architects design an efficient and high performing cache hierarchy. One of the key design choices for a multilevel cache hierarchy is whether or not to enforce inclusion. See, e.g., J. L. Baer and W. Wang. "On the Inclusion Properties for Multi-level Cache Hierarchies," ISCA, 1988; M. Zahran. "Non-inclusion property in multi-level caches revisited," IJCA'07, 2007; N. Jouppi and S. E. Wilton. "Tradeoffs in two-level on-chip caching," ISCA, 1994. While inclusion greatly simplifies the cache coherence protocol (see, e.g., X. Chen, Y. Yang, G. Gopalakrishnan, and C. Chou. "Reducing verification complexity of a multicore coherence protocol using assume/guarantee," FMCAD, 2006; J. L. Baer and W. Wang, "On the Inclusion Properties for Multi-level Cache Hierarchies," ISCA, 1988) it limits performance when the size of the largest cache is not significantly larger than the sum of the smaller caches. In such scenarios, CPU architects resort to non-inclusive cache hierarchies (see, e.g., M. Zahran. "Non-inclusion property in multi-level caches revisited," IJCA'07, 2007), or exclusive cache hierarchies (see, e.g., N. Jouppi and S. E. Wilton, "Tradeoffs in two-level on-chip caching," ISCA, 1994).

The inclusion property requires that the contents of all the smaller caches of a multi-level cache hierarchy be a subset of the last-level cache (LLC). See, e.g., J. L. Baer and W. Wang, "On the Inclusion Properties for Multi-level Cache Hierarchies," in ISCA, 1988. When a line is evicted from the LLC, inclusion is enforced by removing that line from all the caches in the hierarchy. Cache lines invalidated in the small caches as a result of inclusion are referred to herein as "inclusion victims." The small caches, sometimes referred to herein as "core caches," hide the temporal locality from the LLC when they service requests. Since replacement state is only updated to Most Recently Used (MRU) on cache hits, the LLC replacement state of "hot" lines constantly serviced by the core caches decays to least recently used (LRU) in the LLC. As a result, the "hot" lines become candidates for eviction in the LLC. The number of inclusion victims dramatically increases when multiple applications compete for the LLC or when the LLC is not significantly larger than the sum of all the core caches. A straightforward mechanism to eliminate inclusion victims would be to remove the requirement that core caches be a subset of the LLC. Such a "non-inclusive" cache (see, e.g., M. J. Mayfield, T. H. Nguyen, R. J. Reese, and M. T. Vaden, "Modified L1/L2 cache inclusion for aggressive prefetch," U.S. Pat. No. 5,740,399), allows cache lines to reside in the core cache(s) without also being duplicated in the LLC. In doing so, non-inclusion increases the effective capacity of the cache hierarchy (see, e.g., M. Zahran, "Non-inclusion property in multi-level caches revisited," IJCA'07, 2007; Y. Zheng, B. T. Davis, and M. Jordan, "Performance Evaluation of Exclusive Cache Hierarchies," ISPASS, 2004. Unfortunately, non-inclusion eliminates the natural snoop filter benefit that an inclusive LLC provides, thus breaking the coherence benefits that come with inclusivity (see, e.g., J. L. Baer and W. Wang, "On the Inclusion Properties for Multi-level Cache Hierarchies," ISCA, 1988. While snoop filters (see, e.g., A. Agarwal, R. Simoni, J. Hennessy, and M. Horowitz, "An evaluation of directory schemes for cache coherence," ISCA, 1988; V. Salapura, M. Blumrich, and A. Gara, "Design and implementation of the Blue Gene/P snoop filter," HPCA, 2008; R. Simoni, "Cache Coherence Directories for Scalable Multiprocessors," PhD thesis, Stanford University, October 1992) can be used in addition to the LLC, such structures increase the hardware overhead (see, e.g., Y. Zheng, B. T. Davis, and M. Jordan, "Performance Evaluation of Exclusive Cache Hierarchies," ISPASS, 2004) and verification complexity (see, e.g., X. Chen, Y. Yang, G. Gopalakrishnan, and C. Chou, "Reducing verification complexity of a multicore coherence protocol using assume/guarantee," FMCAD, 2006). It would be beneficial to design a cache hierarchy that reduces (if not eliminates) the frequency of inclusion victims while providing the coherence benefits of inclusion. Thus, one goal discussed below is to bridge the performance gap between inclusion and non-inclusion by improving the management of an inclusive LLC.

BRIEF DESCRIPTION OF THE DRAWINGS

A better understanding of the present invention can be obtained from the following detailed description in conjunction with the following drawings, in which.

DETAILED DESCRIPTION

I. Introduction

It is a widely held belief that the primary benefits of a non-inclusive cache hierarchy come from the increase in the effective caching capacity. However, the inventors of the present application have determined that one important benefit of non-inclusion is the elimination of inclusion victims and not the extra cache capacity. In light of this observation, it is illustrated below that that inclusive hierarchies can perform similar to non-inclusive hierarchies by preserving hot lines in the core caches and extending the life time of these lines in the LLC. Proposed below are Temporal Locality Aware (TLA) inclusive cache management policies to reduce the frequency of harmful inclusion victims. The success of TLA policies requires identifying lines that have high temporal locality in the core caches and preventing LLC replacement of these lines until their temporal locality is exhausted in the core caches. Three TLA cache management policies are described where the identity of hot lines is either conveyed to, derived by or inferred by the LLC:

1. Temporal Locality Hints (TLH) convey the temporal locality of "hot" lines in the core caches by sending hints to the LLC to update its replacement state. With the same temporal information as the core caches, the LLC is significantly less likely to choose a victim that will cause an inclusion victim.

2. Early Core Invalidation (ECI) derives the temporal locality of a line before it becomes LRU in the LLC. The LLC chooses a line early and invalidates that line in the core caches, while leaving the line in the LLC. By observing the core's subsequent request, the LLC derives the temporal locality.

3. Query Based Selection (QBS) infers the temporal locality of a line in the LLC by querying the core caches. The LLC selects a line for replacement and queries the core caches for approval. The LLC uses the information provided by the core caches to infer the temporal locality and select a victim. QBS employs the heuristic that the core has better information about temporal locality, and it is best suited to propose which lines can be evicted.

Evaluations performed on 2-core, 4-core, and 8-core chip-level multiprocessors (CMPs) show that the three TLA cache management proposals improve inclusive cache performance with QBS performing similar to a non-inclusive cache. Significantly, the proposed policies do not require any additional hardware structures and only require extra messages in the system.

The organization of this patent application is as follows: Section II provides a more in depth motivation for the work; Section III introduces TLA cache management; Section IV describes experimental methodology, followed by experimental results in Section V. Section VI provides a summary.

II. Motivation

Figure 1:
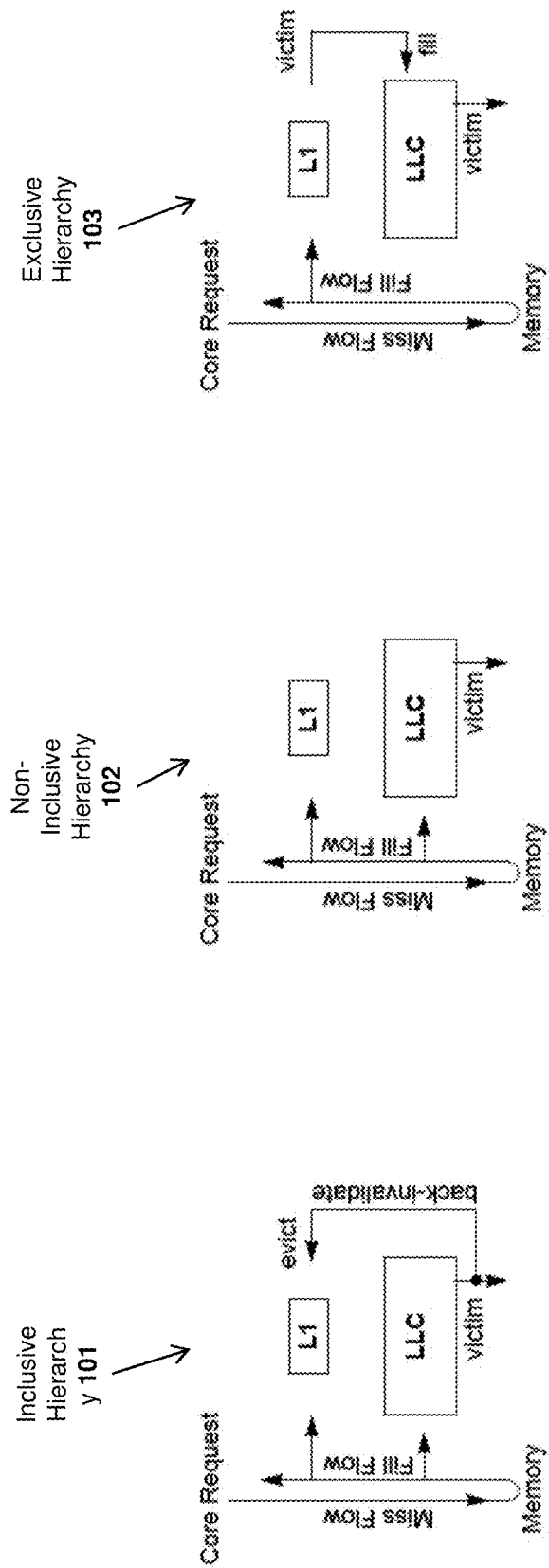
FIG. 1 illustrates implementations of inclusive, non-inclusive, and exclusive cache hierarchies.

FIG. 1 illustrates the different types of cache hierarchies 101, 102, 103. An inclusive cache hierarchy 101 requires that the contents of the smaller cache levels be a subset of the LLC. When a line is evicted from the LLC, inclusion is enforced by back-invalidating (i.e., removing) that line from the smaller cache levels (e.g., the L1). The capacity of an inclusive cache hierarchy is equal to the size of the LLC. Inclusive caches are beneficial because they serve as a natural snoop filter. When an LLC lookup results in a miss, no snoops need to be sent to the core caches because they are guaranteed to not be present in the core caches.

A non-inclusive cache hierarchy 102, on the other hand, does not guarantee that the smaller cache levels be a subset of the LLC. As such, the capacity of a non-inclusive cache hierarchy ranges between the size of the LLC and the sum of all levels in the cache hierarchy.

Finally, an exclusive cache hierarchy 103 requires that the contents of any cache level are not replicated in any other cache level. Exclusive hierarchies first fill cache lines at the smallest level in the hierarchy and fill them into subsequent larger cache levels upon eviction from the smaller cache levels. Exclusive caches require higher bandwidth since even clean victims from the core caches have to be written to the LLC. The capacity of an exclusive cache hierarchy is equal to the sum of the sizes of all the caches in the hierarchy. Unfortunately, non-inclusive and exclusive caches increase the capacity of a hierarchy by sacrificing the natural snoop filter benefits of inclusive caches.

Figure 2:
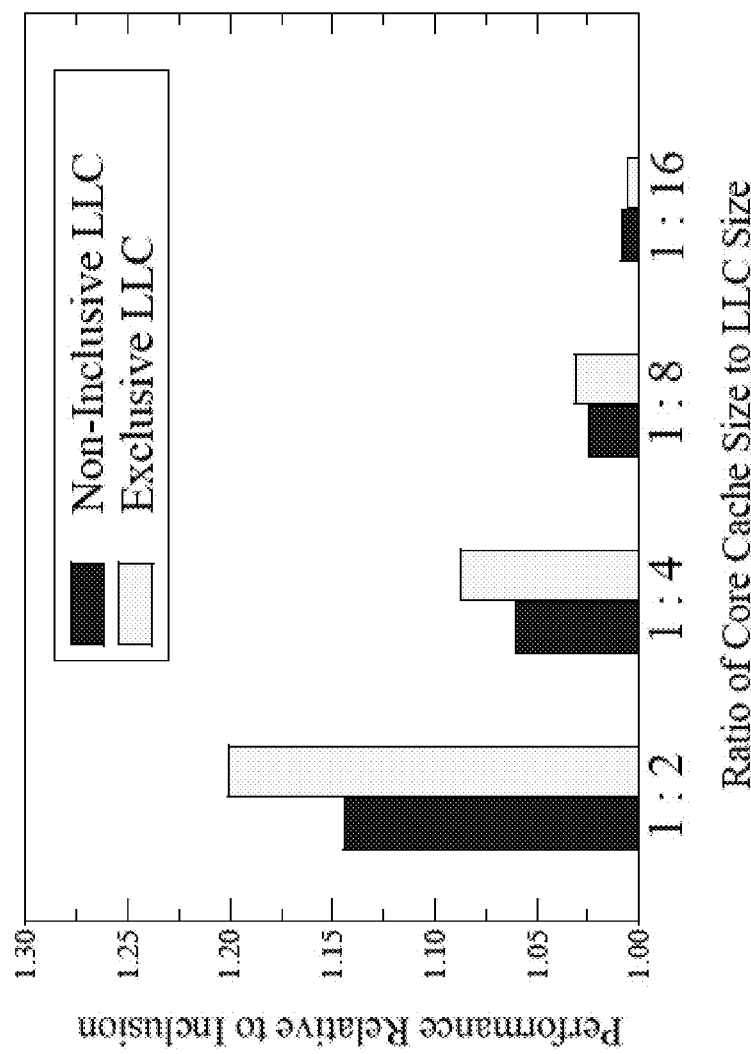
FIG. 2 illustrates performance of non-inclusive and exclusive cache hierarchies relative to the ratio of core cache size to lower level cache size.

In general, the choice of cache hierarchy is dependent on the ratio of the size of small caches (i.e., core caches) to the LLC. FIG. 2 compares the performance of non-inclusive and exclusive LLCs to an inclusive LLC for various core cache to LLC size ratios. The figure shows that inclusive caches typically perform worse than non-inclusive and exclusive caches. When the LLC size is more than 8× larger than the core caches, the performance of non-inclusive and exclusive LLCs are similar to an inclusive LLC. However, when the LLC shrinks, both non-inclusive and exclusive LLCs perform significantly better than inclusive LLCs.

Modern day Intel microprocessors (like the Intel Core i7 processor) have a 1:8 cache ratio and implement inclusive LLCs while AMD microprocessors (like the Phenom II processor) have a 1:4 cache ratio and implement non-inclusive LLCs. The figure shows that inclusive LLCs with 1:8 ratio have an average of 3% (max 12%) worse performance than non-inclusive/exclusive LLCs. Similarly, inclusive LLCs with a 1:4 ratio have an average of 8% (up to 33%) worse performance than non-inclusive/exclusive LLCs. For such cache ratios, it is better not to enforce inclusion. Both noninclusive/exclusive LLCs improve performance over inclusive LLCs by eliminating inclusion victims and increasing the effective caching capacity of the hierarchy. Since we cannot change the requirement that inclusion duplicate lines in the LLC, we focus on eliminating inclusion victims to improve inclusive cache performance.

Inclusion victims manifest on CMPs whenever applications with working set sizes that fit in the core caches concurrently execute with applications that have working set sizes that are greater than or equal to the size of the LLC. In such situations, the core caches hide all the temporal locality of the core cache fitting (CCF) applications from the LLC. Consequently, the LLC replacement state of cache lines belonging to the CCF applications decay towards LRU when LLC fitting (LLCF) or LLC thrashing (LLCT) applications exercise the LLC. As a result, the CCF applications suffer from inclusion victims even though they have high temporal locality in the core caches.

The problem of inclusion victims is not intrinsic to CMPs alone. It can also manifest in a single-core, single-threaded system where non-unified instruction and data caches share a unified LLC. For example, a streaming application whose instruction working set fits in its instruction cache can suffer from inclusion victims when references to non-temporal data evict the instruction working set from the LLC. Maintaining inclusion and avoiding inclusion victims for code lines is applicable for architectures that require code lines to be coherent due to self-modifying code (e.g. x86). Inclusive cache performance can be improved if the LLC knew of the temporal locality of lines in the core caches. To address this problem, the next section proposes Temporal Locality Aware cache management policies for LLCs.

III. Temporal Locality Aware (TLA) Management

In a multi-level hierarchy, the core caches act as a filter and hide the temporal locality from the LLC. Thus, the LLC only observes the references that miss in all levels prior to the LLC.

For lines that have high temporal locality in the core caches, the replacement state of the line in the LLC can decay to LRU. The line eventually gets evicted from the LLC and due to the inclusive hierarchy, the line is also evicted from the core caches (an inclusion victim). To illustrate this problem, consider the following unfiltered cache reference pattern:

. . . a, b, a, c, a, d, a, e, a, f, a, . . . .

Figure 3:
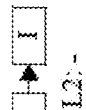
FIG. 3 illustrates different techniques for performing cache line invalidation including early core invalidation (ECI) and query based selection (QBS).

Note that the references to 'a' have high temporal locality. FIG. 3 illustrates a two-level inclusive cache hierarchy with a fully associative 2-entry L1 cache and a fully-associative 4-entry LLC. Both the L1 and LLC start with all entries invalid. The boxes and arrows represent the LRU chain, with the MRU line on the left and LRU line on the very right. The figure starts after the reference to 'c.'

A. Baseline Inclusive Cache

Column (a) illustrates the behavior of an inclusive cache hierarchy. The figure shows that in the L1 cache, 'c' is the MRU entry and 'a' is the LRU entry at 301. In the LLC, 'c' is the MRU entry, and the LRU entry is an invalid line, 'I'. The next reference to 'a' hits in the L1 cache and updates 'a' to the MRU position at 302. Since 'a' hits in the L1 cache, only the L1 replacement state is updated and the LLC replacement state stays unchanged. The next reference, 'd', misses in the hierarchy and replaces lines 'c' and 'I' in the L1 and LLC respectively. Line 'a' is now the LRU line in both the L1 and LLC at 303.

The next reference to 'a' hits in the L1 cache. Again, 'a' is moved to the MRU position of the L1 cache at 304 and no replacement updates occur in the LLC. The next reference 'e' misses in both the L1 and LLC. Since 'a' is now the LRU entry in the LLC, it is chosen for eviction at 305, even though it is the MRU line in the L1 cache. Due to the enforcement of inclusion, line 'a' is an inclusion victim and is removed from the L1 cache leaving an invalid entry behind (not shown in the figure). Line 'e' takes the place of 'a' in the LLC at and the invalid entry left behind by 'a' in the L1 cache. Line 'e' is promoted to the MRU position in both the caches 305. The next reference, 'a', misses in both the L1 and LLC.

For the above reference pattern, line 'a' misses to memory on every ninth reference to the L1 cache, despite its high temporal locality. If the LLC were non-inclusive or if the temporal locality of 'a' was not hidden from the LLC by the L1, 'a' would never have been back-invalidated and suffer a core cache miss.

Reducing the harmful effects of inclusion requires that lines with high temporal locality in the core caches not be chosen for eviction in the LLC until their temporal locality in the core caches is exhausted. This implies that the LLC replacement state should be made aware of the temporal locality of lines in the core caches.

B. Temporal Locality Hints (TLH)

Figure 4B:
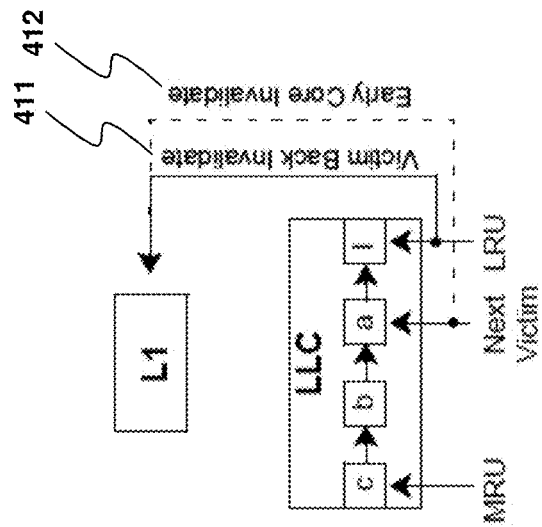
FIGS. 4a-c illustrate different Temporal Locality Aware (TLA) Cache Management Policies.
Figure 4A:
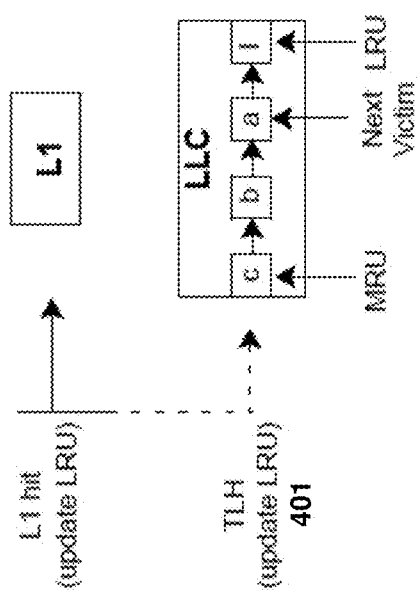

Inclusion victims can be eliminated by conveying the temporal locality of lines in the core caches to the LLC. A direct mechanism would be to inform the LLC of the unfiltered temporal locality. On a hit in the core caches, temporal locality information can be conveyed to the LLC by issuing a Temporal Locality Hint (TLH) 401 as shown in FIG. 4a. The hint is a non-data request that updates the replacement state of the line in the LLC. The heuristic used is that if a line is hot in a core cache, it is worth preserving in the LLC.

We illustrate the use of TLHs in column (b) of FIG. 3. At the L1 cache, the replacement behavior remains the same as the base case at 311-315. For every L1 cache hit, the line is moved to the MRU position in the L1 cache and a TLH is sent to the LLC. The LLC uses the hint to promote that line to the MRU position in its LRU chain. Thus, in our example reference pattern, L1 cache hits on 'a' update the LRU state in both the L1 and LLC at 312 and 314. Thus, when the reference to 'e' occurs at 314, 'a' is not in the LRU position and is not evicted from the LLC. As such, by conveying the temporal locality of 'a', TLHs prevent inclusion victims.

TLHs can significantly reduce the number of inclusion victims because they keep the LLC replacement state up-to-date with the core caches. However, the downside is that they send a request to the LLC for every hit in the core caches. Optimizations may be made by filtering the number of TLHs sent from the core caches to the LLC. For example, in a multilevel hierarchy, the second level cache can issue TLHs instead of the first level cache. Alternatively, the L1 cache can issue TLHs for non-MRU lines. However, even with filtering of TLHs to the LLC, the number of requests to the LLC is extremely large and does not scale well with increasing number of cores. Thus, for the purpose of this study, the use of TLHs are evaluated as a limit study to determine the potential performance of avoiding inclusion victims altogether. Instead of using TLHs, embodiments of the invention may employ low overhead solutions referred to as Early Core Invalidation (ECI) and Query Based Selection (QBS).

C. Early Core Invalidation (ECI)

Early Core Invalidation (ECI) is a technique for deriving the temporal locality of a line. The intent is to invalidate a line from the core caches early (but retain the line in the LLC) and observe a core's response to derive the line's temporal locality. If the line is hot in a core cache, the core will re-request it. If this request arrives before the line gets evicted from the LLC, it will be a hit. As with all hits, the temporal locality at the LLC causes a replacement state update. If a core does not reference the line, or the re-reference takes too much time, the line will be evicted by the next miss to that set.

Sending an ECI to the core caches is relatively straightforward. As illustrated in FIG. 4b, upon a miss in the LLC, the standard victim flow happens normally—a victim is selected and evicted from the LLC and core caches to make room for the incoming line at 411. ECI adds another step to the miss path by selecting another victim (the next LRU line) and sending an ECI to the core caches to have that line evicted at 412. The line still remains in the LLC though.

We illustrate the behavior of ECI in column (c) of FIG. 3 which shows operations 321-325 corresponding to 301-305 and 311-315 from columns (a) and (b), respectively. Unlike TLHs no update traffic to the LLC is required. When the reference to 'd' misses in both the L1 and LLC at 322, the miss at the LLC is handled as usual by evicting the LRU line, 'I'. With ECI, the next LRU line, 'a', is also evicted from the L1 cache (it is still retained in the LLC) as shown at 323. This results in 'd' being MRU in L1 and LLC, and 'I' and 'a' being LRU in the L1 and LLC, respectively. The next reference to 'a' at 324 misses in L1 but hits in the LLC. This updates the replacement state of 'a' in the LLC. By prematurely evicting line 'a' from the core caches and then observing the subsequent request for 'a', the LLC derived that 'a' was hot, and captured the temporal locality of 'a.'

Note, however, that ECI is time sensitive. The core must re-reference the line within a window of opportunity. For instance, had a new line been referenced at 324 before the re-reference to 'a', 'a' would have been evicted. A line has to be hot relative to the time window, a time window that will vary depending on the level of contention at the LLC.

With ECI, the number of lines that need to be invalidated in the core caches on each LLC miss may be either one or two. If an early invalidated line has not been re-referenced, it is not in any core caches. Thus, when the next miss occurs, that line is chosen as the victim, and because it is not in any core caches, the back-invalidate request is not required. Only the ECI needs to be sent out for the next LLC victim. In contrast, if an early invalidated line is re-referenced by a core before LLC eviction, its LLC replacement state is updated. Thus, the next miss after such a hot line rescue will need to find a victim to evict, which will incur a normal invalidate as required by inclusion along with the ECI to derive the temporal locality of the next potential victim. Note that ECI happens in the shadow of the miss to memory, and thus is not time critical.

As compared to TLHs, ECI is a lower traffic solution to derive a line's temporal locality. This is because the number of TLHs is directly proportional to the number of core cache hits (which is high) while ECI request traffic is directly proportional to the number of LLC misses (which is orders of magnitude smaller than the number of core cache hits). There are trade-offs though. The early invalidate is a prediction that the line will not be needed by the core caches. If the prediction is incorrect, the scheme allows a time window (until the next miss to that set) for the core caches to correct the prediction by re-requesting the line. If the core re-requests the line in that time window, then the downside is that what would've been a hit in the core caches has become a hit in the LLC. The added latency of getting the data from the LLC instead of the core caches is traded against extending the line's lifetime in the LLC. The more significant downside is when the re-request for the line misses the time window. The consequence is an LLC miss that must be serviced from main memory. The time window for a core to re-reference an early invalidated line restricts the ability of the LLC to fully derive the temporal locality, and thus limits the potential benefits of ECI.

D. Query Based Selection (QBS)

To address the drawbacks of ECI, one embodiment of the invention employs Query Based Selection (QBS). Like ECI, QBS is also initiated from the LLC. Instead of invalidating a line early and having the cores re-request it, QBS avoids invalidating lines in the core caches altogether. QBS queries the core caches and has them indicate if a line is resident in the core caches and uses that information to infer the temporal locality of those lines. Lines resident in the core caches are inferred to have high temporal locality and are not evicted from the LLC.

Figure 4C:
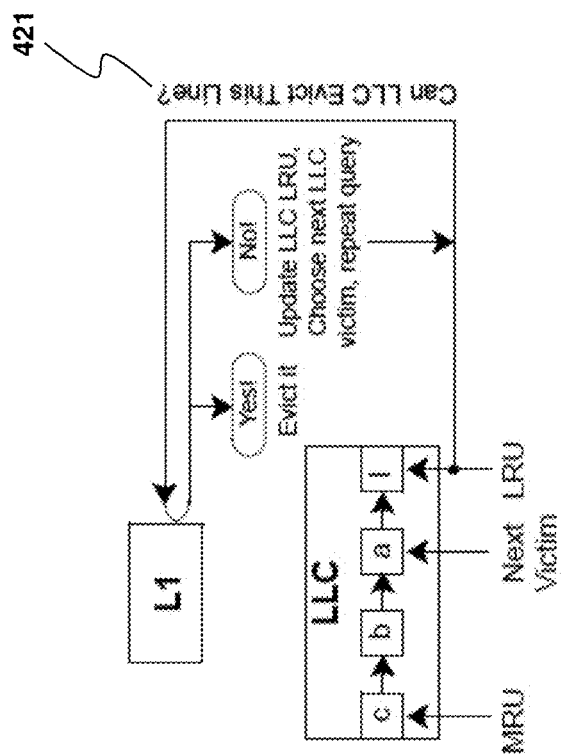

As illustrated in FIG. 4c, on an LLC miss, the cache controller selects the LRU line as the victim and queries the core caches at 421 to determine if the line can be evicted from the LLC. If the line is not present in any of the core caches, QBS evicts this line to make space for the incoming line. However, if the current victim line is present in any of the core caches, QBS updates the line's LLC replacement state to MRU and extend its lifetime in the LLC. Since a victim still needs to be selected, a new victim is chosen and the process repeats. The QBS victim selection process is typically hidden by memory latency. Should the data arrive from memory before QBS selects a victim, the cache controller can either wait for QBS to finish selecting a victim or force QBS to select the next victim. Alternatively, the cache controller can limit the number of queries issued on an LLC miss. When the maximum is reached, the next victim line is selected for replacement and no further queries are sent to the core caches.

The behavior of QBS according to one embodiment is illustrated at 331-335 in column (d) of FIG. 3. When the reference to 'e' misses in the LLC at 334, QBS queries the core caches to determine whether it can evict the first potential LLC victim, 'a.' When the core caches are queried for 'a', the core responds that the line is present in the L1 cache. Consequently, the LLC replacement state of 'a' is updated to MRU and a query for the next victim, 'b', is sent. Since 'b' is not resident in the L1 cache, the core allows 'b' to be replaced from the LLC. Thus, when 'a' is re-referenced at 335, it hits in the L1 cache. QBS has prevented 'a' from being an inclusion victim.

By preventing the LLC from evicting lines that are still resident in the core caches, QBS prevents "hot lines" from becoming inclusion victims. QBS addresses the time window problem of ECI and avoids LLC misses.

IV. Experimental Methodology

A. Simulator

For simulation CMP$im, a Pin based trace-driven x86 simulator was used. The baseline system is a 2-core CMP. Each core in the CMP is a 4-way out-of-order processor with a 128-entry reorder buffer and a three level cache hierarchy. Without loss of generality, a single-thread per core is assumed. The L1 and L2 caches are private to each core. The L1 instruction and data caches are 4-way 32 KB each while the L2 cache is unified 8-way 256 KB. The L1 and L2 cache sizes are kept constant. Two L1 read ports and one L1 write port is supported on the data cache. The baseline last-level cache (LLC) is a unified 16-way 2 MB cache that is shared by both the cores in the CMP. A banked LLC is assumed with as many banks as there are cores in the system. Like the Intel Core i7, a non-inclusive L2 cache is modeled and only the last-level cache enforces inclusion. All caches in the hierarchy use a 64B line size. For replacement decisions, the L1 and L2 caches use the LRU replacement policy while the LLC uses the Not Recently Used (NRU) replacement policy. A stream prefetcher is modeled that trains on L2 cache misses and prefetches lines into the L2 cache. The prefetcher has 16 stream detectors. The load-to-use latencies for the L1, L2, and LLC are 1, 10, and 24 cycles respectively. A 150 cycle penalty is modeled to main memory and supports 32 outstanding misses to memory. The cache hierarchy organization and latencies are based on the Intel Core i7 processor. The proposed policies do not rely on the specific latencies used. It has been verified that the proposed policies perform well for different latencies including pure functional cache simulation. The policies using both the throughput and cache performance metrics are compared.

An interconnect with a fixed average latency is modeled. Bandwidth onto the interconnect is modeled using a fixed number of MSHRs. Contention for the MSHRs models the increase in latency due to additional traffic introduced into the system. All transactions, including those for ECI and QBS, use existing data paths and contend for the MSHRs. Bandwidth limitations are not modeled for the Temporal Locality Hints (TLH). TLHs serve as a limit study on potential performance improvement if temporal locality information from all levels in the hierarchy were available at the LLC.

The performance of the proposed TLA policies are compared to non-inclusive and exclusive cache hierarchies. Cache latencies are identical to the baseline inclusive cache hierarchy for both these cache hierarchies. A non-inclusive cache hierarchy is modeled by not sending back-invalidates to the core caches when replacing lines from the LLC. To model an exclusive cache hierarchy both the hit and miss paths are modified. Lines are invalidated in the LLC upon cache hits. As for the miss path, new lines are inserted into the core caches first. These lines are inserted into the LLC only after they are evicted from the core caches. Exclusive caches typically require higher LLC bandwidth because even clean victims from the core caches must be inserted into the LLC. This increased bandwidth is not modeled, and thus the results for exclusive caches are optimistic.

B. Benchmarks

The SPEC CPU2006 benchmarks were first grouped into three different categories based on their L1, L2, and LLC cache hit behavior. The first category is those applications whose working set fits in the core caches. These applications are referred to as core cache fitting (CCF) applications. The second category is those applications whose working set fits in the LLC. These applications are referred to as LLC fitting (LLCF) applications. Finally, the third category is those applications whose working set is larger than the LLC. These applications are referred to as LLC thrashing (LLCT) applications. Of all the SPEC CPU2006 benchmarks, five are selected from each category to cover the spectrum of hit/miss behavior in the different levels of the cache hierarchy. The 15 representative SPEC CPU2006 benchmarks were compiled using the icc compiler with full optimization flags. Representative regions for the SPEC benchmarks were all collected using Pin Points. Table I lists the 15 SPEC CPU2006 benchmarks and their misses per 1000 instructions (MPKI) in the L1, L2, and LLC when run in isolation. The MPKI numbers are reported in the absence of a prefetcher.

TABLE I

MPKI of Representative SPEC CPU2006 Applications In the Absence of Prefetching

|  | ast | bzi | cal | dea | gob | h26 | hmm | lib | mcf | per | pov | sje | sph | wrf | xal |
|---|---|---|---|---|---|---|---|---|---|---|---|---|---|---|---|
| L1 MPKI (64 KB) | 29.29 | 19.48 | 21.19 | 0.95 | 10.56 | 11.26 | 4.67 | 38.83 | 21.51 | 0.42 | 15.08 | 0.99 | 19.03 | 16.50 | 27.80 |
| L2 MPKI (256 KB) | 17.02 | 17.44 | 14.06 | 0.22 | 7.91 | 1.57 | 2.76 | 38.83 | 20.43 | 0.20 | 0.18 | 0.37 | 16.20 | 15.18 | 3.38 |
| LLC MPKI (2 MB) | 3.16 | 7.25 | 1.42 | 0.08 | 7.70 | 0.16 | 1.21 | 38.83 | 20.30 | 0.11 | 0.03 | 0.32 | 14.00 | 14.67 | 2.30 |

Based on the MPKI values in Table I, deaIII, h264ref, perlbench, povray, and sjeng all have small miss rates in the L2 cache. This implies that these benchmarks have working sets that fit into the core caches. Thus, for the baseline cache hierarchy, these applications may be classified as CCF applications. The benchmarks gobmk, libquantum, mcf, sphinx3, and wrf all have working set sizes that are larger than the baseline LLC size. This is because these applications have almost as many misses as there are accesses to the LLC. Thus, for the baseline cache hierarchy, these applications can be classified as LLCT applications. Finally, the benchmarks astar, bzip2, calculix, hmmer, and xalancbmk all have working set sizes larger than the L2 cache but benefit from the LLC. Thus, for the baseline cache hierarchy, these applications may be classified as LLCF applications.

In general, CCF applications are vulnerable to inclusion related evictions when concurrently executing with LLCT or LLCF applications. To study the effects of inclusion, all possible two-threaded combinations of the 15 SPEC benchmarks were run, i.e., 15 choose 2-105 workloads. To provide insights on when TLA policies are beneficial, 12 workload mixes were selected (listed in Table II) to showcase results. However, results are provided for all 105 workloads.

TABLE II

Workload Mixes

| Name | Apps | Category |
|---|---|---|
| MIX_00 | bzi, wrf | LLCF, LLCT |
| MIX_01 | dea, pov | CCF, CCF |
| MIX_02 | cal, gob | LLCF, LLCT |
| MIX_03 | h26, per | CCF, CCF |
| MIX_04 | gob, mcf | LLCT, LLCT |
| MIX_05 | h26, gob | CCF, LLCT |
| MIX_06 | hmm, xal | LLCF, LLCF |

TABLE II-continued

Workload Mixes

| Name | Apps | Category |
|---|---|---|
| MIX_07 | dea, wrf | CCF, LLCT |
| MIX_08 | bzi, sje | LLCF, CCF |
| MIX_09 | pov, mcf | CCF, LLCT |
| MIX_10 | lib, sje | LLCT, CCF |
| MIX_11 | ast, pov | LLCF, CCF |

A total of 250 million instructions were simulated for each benchmark. Simulations continue to execute until all benchmarks in the workload mix execute at least 250 million instructions. If a faster thread finishes its 250M instructions, it continues to execute to compete for cache resources. Statistics were collected for the first 250 million instructions committed by each application. This methodology is similar to existing work on shared cache management.

V. Results and Analysis

A. Temporal Locality Hints—a Limit Study

Figure 5:
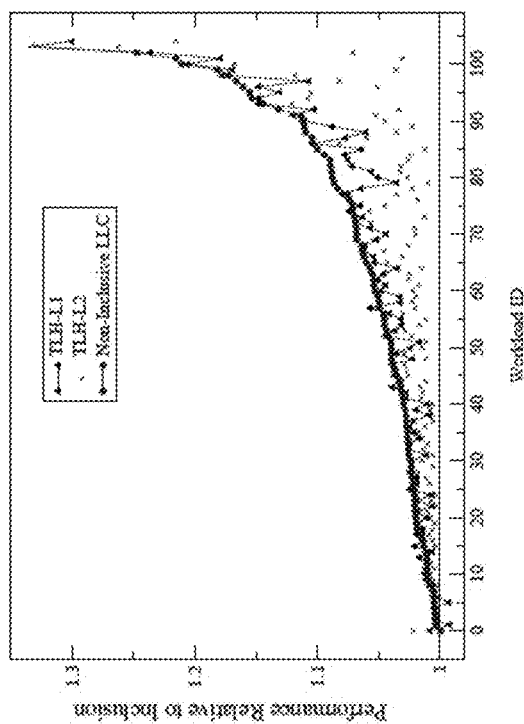
FIG. 5 illustrates performance of Temporal Locality Hints (TLHs).
Figure 5:
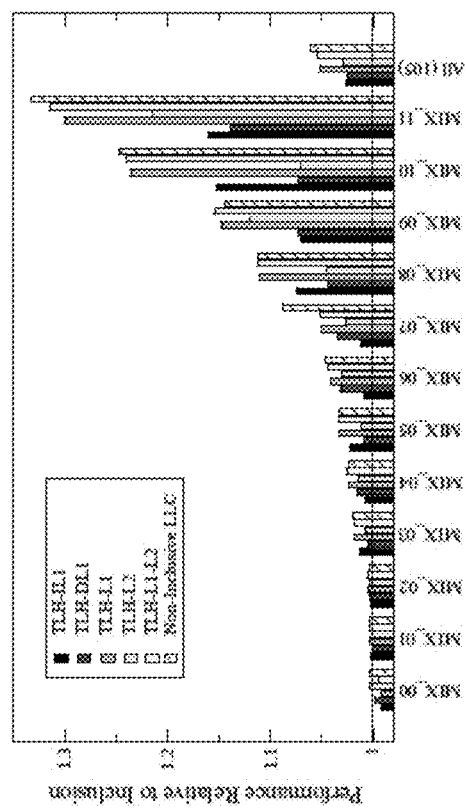

FIG. 5 shows the throughput normalized to the baseline inclusive cache hierarchy when all requests at different levels in the hierarchy send TLHs. As a reminder, bandwidth constraints are not modeled when sending TLHs to the LLC. The first three bars in the figure show the performance when the L1 instruction cache alone sends TLHs (TLH-IL1), the L1 data cache alone sends TLHs (TLH-DL1), and when both L1 instruction and data caches send TLHs (TLH-L1). The x-axis represents the different workload mixes and the bar labeled "All" represents the geomean of all 105 workloads used in the study. TLH-IL1 and TLH-DL1 alone improve throughput by 5% or more for the workload mixes MIX_08, MIX_09, MIX_10, and MIX_11. For these workload mixes, the performance improvements are additive when both the IL1 and DL1 caches send TLHs (i.e., TLH-L1). This is because these workload mixes are composed of a CCF application that is running concurrently with an LLCT or LLCF application. Sending TLHs from the core caches prevents LLCT and LLCF applications from evicting the cache lines of CCF applications from the LLC. This allows TLHs to improve the performance of an inclusive cache by as much as 31%. The figure also shows that homogeneous workload mixes of CCF applications (MIX_01 and MIX_03) or workload mixes that have a combination of LLCT and LLCF applications (workload mixes MIX_00 and MIX_02) receive no benefits from TLHs.

For such mixes, inclusion victims are not a problem because either all benchmarks have working sets that fit in the core caches or all have working set sizes that are larger than the core caches. On average, TLH-IL1, TLH-DL1, and TLH-L1 improve throughput by 2.6%, 2.5% and 5.2% respectively.

FIG. 5 also presents the performance of TLHs when only the L2 cache hits send a TLH to the LLC (TLH-L2). On average, TLH-L2 has roughly two-thirds the performance of TLH-L1. For example, MIX_10 observes only 7% improvement in throughput with L2 generated TLHs compared to 24% improvement from L1 generated TLHs. MIX_10, consists of benchmarks libquantum and sjeng. From Table I, it can be seen that libquantum has no locality in any of the caches while sjeng has good L1 cache locality. Thus, TLH-L2 is unable to refresh the LRU state of the lines belonging to sjeng in the LLC.

FIG. 5 also illustrates that the performance of TLH-L1 and TLH-L2 is not additive when both the L1 and L2 caches send TLHs (TLH-L1-L2). In fact, TLH-L1 provides the bulk of the performance improvements when all levels in the hierarchy send TLHs. FIG. 5 shows that TLH-L1 bridges 85% of the gap between inclusive and non-inclusive cache hierarchies while TLH-L2 only bridges 45% of the gap between inclusive and non-inclusive caches. FIG. 5 also shows the s-curve for the throughput improvement of TLHL1, TLH-L2, and a non-inclusive LLC for all 105 two-core workload mixes. The s-curve is sorted based on non-inclusive cache performance. In the figure, 'x' represents TLH-L2 and triangles represent TLH-L1. The figure shows that TLH-L1 closely tracks the performance of non-inclusion for the bulk of the workloads. These results show that the performance of a non-inclusive cache hierarchy can be achieved by allowing an inclusive LLC to be aware of the global temporal locality of lines that are resident in the LLC.

While TLH-L1 bridges the gap between inclusive and non-inclusive caches, the number of LLC requests increase by almost 600×. In comparison, TLH-L2 increases the number of requests to the LLC by about 8×. We conducted a sensitivity study on the fraction of hits that can send hints to the LLC.

When 1%, 2%, 10%, and 20% of core cache hits in the L1 cache generate TLHs, they bridge the gap between inclusive and non-inclusive cache hierarchies by 50%, 60%,75%, and 80% respectively. However, even when 1% of hits in the L1 cache send TLHs, the number of LLC requests still increases by 6× or more. Thus, while TLH-L1 can potentially bridge the performance gap between inclusive and non-inclusive cache hierarchies, the high bandwidth demands required by TLHs require an alternate low bandwidth technique to allow the LLC to derive or infer the global temporal locality.

B. Early Core Invalidation

Figure 6:
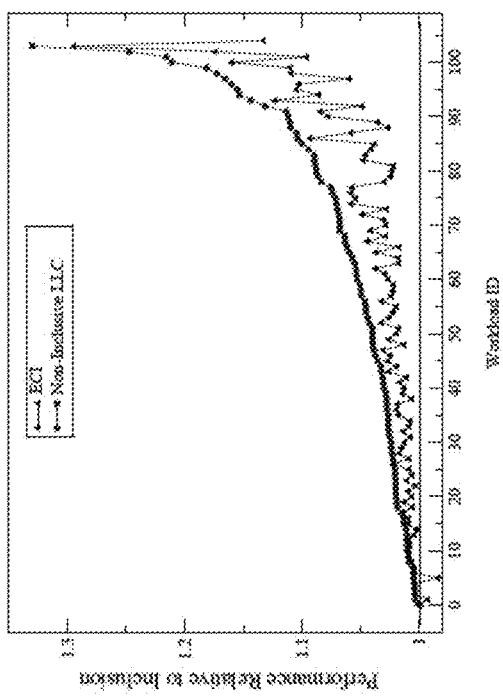
FIG. 6 illustrates performance of Early Core Invalidation (ECI).
Figure 6:
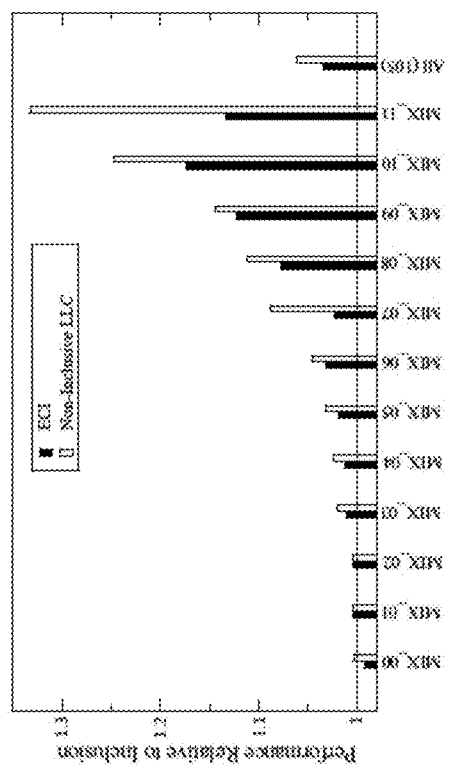

FIG. 6 presents the performance of ECI for the different workload mixes. The figure shows that ECI improves performance by more than 7% for four out of the 12 workloads. The four workloads correspond to the same workloads that benefit from TLHs, i.e. workloads where a CCF application is concurrently executing with LLCT or LLCF applications. On average, ECI bridges 55% of the gap between inclusive and non-inclusive caches. To illustrate this, FIG. 6 also presents the s-curve for ECI for all 105 workloads. Across all workloads, ECI provides up to 30% improvement in performance with the worst case outlier losing only 1.6% performance. Unlike TLHs, ECIs are initiated from the LLC to derive the temporal locality of lines.

The additional back-invalidate requests required by ECI on average is less than 50% (in the worst case it doubles). While the increase in back-invalidates might seem significant, the extra messages introduced by ECI are relative to the number of LLC misses. On average, our studies show an LLC miss rate of 5 misses per 1000 cycles. ECI increases the number of back-invalidates from 5 transactions per 1000 cycles to 7 transactions per 1000 cycles. Since the number of transactions is small to begin with, the increase in back-invalidate requests from the LLC is negligible and can easily be sustained by the cores. As these studies show, the increase in back snoop traffic from the LLC to the cores does not impact performance. The first order benefit of ECI is from avoiding misses to main memory (Cache misses are discussed in Section D below).

C. Query Based Selection

Figure 7:
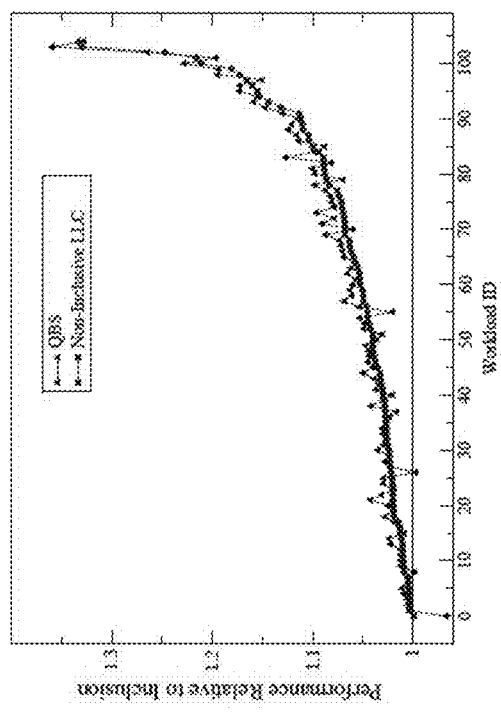
FIG. 7 illustrates performance of Query Based Selection (QBS).
Figure 7:
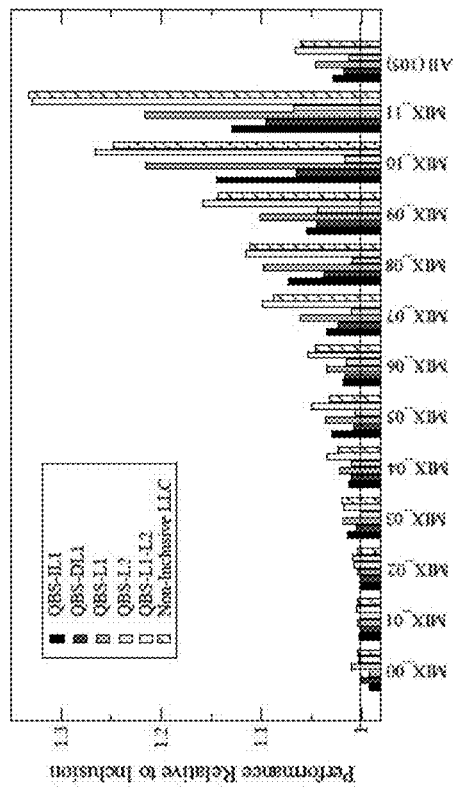

FIG. 7 shows the performance of QBS when applied to different caches in the hierarchy. QBS-IL1 and QBS-DL1 ensure that cache lines resident in the IL1 or DL1 caches are not evicted by the LLC. QBS-L1 ensures that cache lines that are resident in any L1 cache are not evicted by the LLC. QBS-L2 ensures that cache lines resident only in the L2 are not evicted by the LLC. Finally, QBS-L1-L2 ensures that cache lines resident in any cache in the hierarchy are not evicted by the LLC. The figure shows that QBS-IL1 consistently performs better than QBS-DL1. Since instruction cache misses stall the front-end of the pipeline from supplying instructions to the back-end, on average, it is more important to retain code lines in the LLC until their temporal locality is exhausted in the instruction cache. On average, QBS-IL1 improves performance by 2.7% and QBS-DL1 improves performance by 1.6%. QBS-L1 is additive of QBS-IL1 and QBS-DL1 and improves performance by 4.5%. FIG. 7 also shows that QBS-L1 consistently performs better than QBSL2—QBS-L2 improves performance on average by 1.2%. Again, this is because the L1 caches filter out the temporal locality from the L2 caches. Finally, FIG. 7 shows that QBSL1-L2 outperforms non-inclusion on average. To illustrate this, FIG. 7 also presents the s-curve for QBS for all 105 workloads. On average, QBS improves performance by 6.5% while non-inclusion improves performance by 6.1%.

Versions of QBS were also evaluated that limit the number of queries that the LLC can make before selecting a victim. Query limits of 1, 2, 4, and 8 were evaluated for QBS and 6.2%, 6.5%, 6.6% and 6.6% performance improvements were observed, respectively. The baseline inclusive cache hierarchy can be thought of having 0 queries. Performance does not significantly improve beyond two queries because the total capacity of the on-chip caches is equal to the capacity of two ways of the LLC. On average, sending only one query is sufficient to achieve the bulk of the performance benefits. When QBS only sends one query, like ECI, these studies showed a 50% increase in back-invalidate requests from the LLC to the core caches. As discussed for ECI, the 50% increase in back-invalidate requests is negligible because the traffic is small to begin with and the increase in backinvalidate requests from the LLC to the cores can be easily sustained. These studies show that the increase in traffic from the LLC to the cores does not impact performance. Like ECI, the first order benefit of QBS is from avoiding LLC misses.

D. Effect of TLA Mechanisms on Cache Misses

Since inclusion victims require re-fetching "hot" lines from memory, LLC miss reduction is used as the metric to measure the goodness of the proposed TLA policies. While reduction in L1 cache misses can also be compared, they are not applicable to ECI or L2 TLH because they both evict lines from the L1 cache. However, they both avoid requests to memory by preserving "hot" lines in the LLC. Thus, reduction in LLC misses are presented since this metric is applicable to all the TLA policies. It has been verified that the TLA proposals reduce L1 cache misses where applicable.

Figure 8:
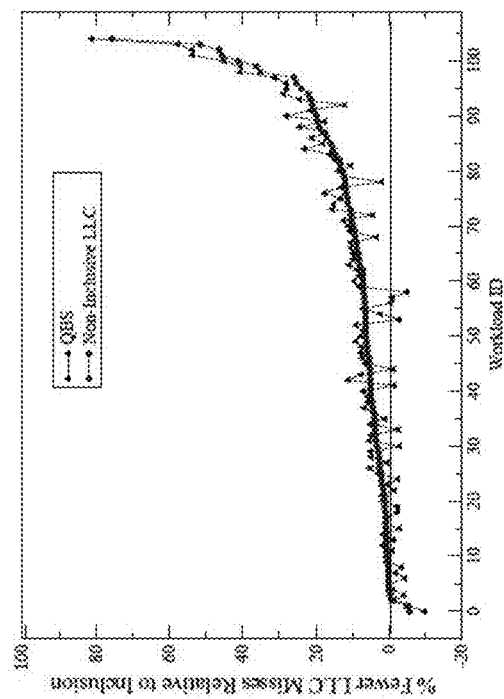
FIG. 8 illustrates cache performance relative to inclusion.
Figure 8:
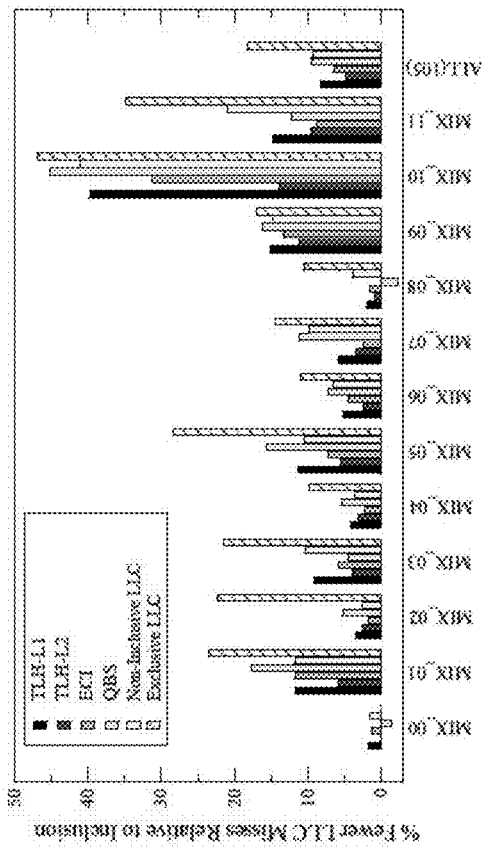

FIG. 8 presents the reduction in LLC misses for the different TLA policies, non-inclusive cache, and exclusive cache when compared to the baseline inclusive cache. The bar labeled All represents the average reduction in LLC misses for all 105 workload mixes. On average, L1 TLH reduces LLC misses by 8.2%, L2 TLH by 4.8%, ECI by 6.5%, QBS by 9.6%, non-inclusive caches by 9.3%, and exclusive caches by 18.2%. On average, QBS performs better than ECI because QBS eliminates the time window problem associated with ECI by updating the replacement state instantly instead of waiting for the line to be rescued by the core. This allows QBS to perform similar to non-inclusive caches without the complexity of non-inclusion. FIG. 8 also presents an s-curve that compares reduction in cache misses across all 105 workload mixes for QBS. Like non-inclusion, QBS reduces cache misses by as much as 80%. These results again emphasize that non-inclusive caches primarily address inclusion victims and not extra capacity. Only exclusive caches take advantage of the extra cache capacity.

E. Summary of all TLA Policies

Figure 9B:
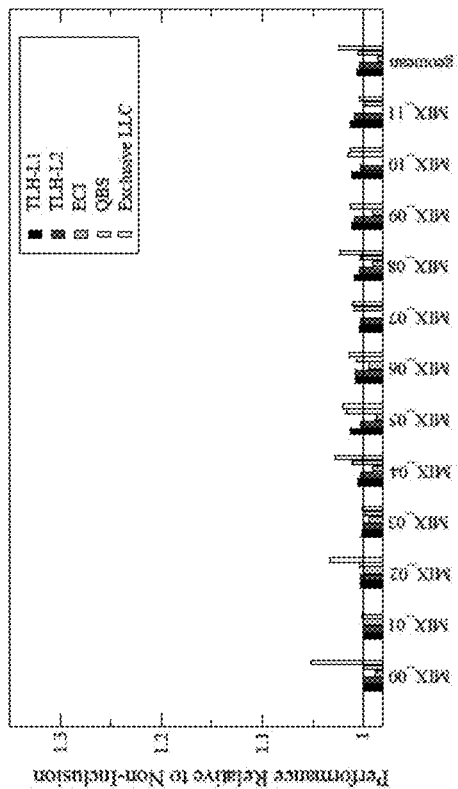
FIG. 9 illustrates performance of TLA cache management policies in the presence and absence of inclusion.
Figure 9A:
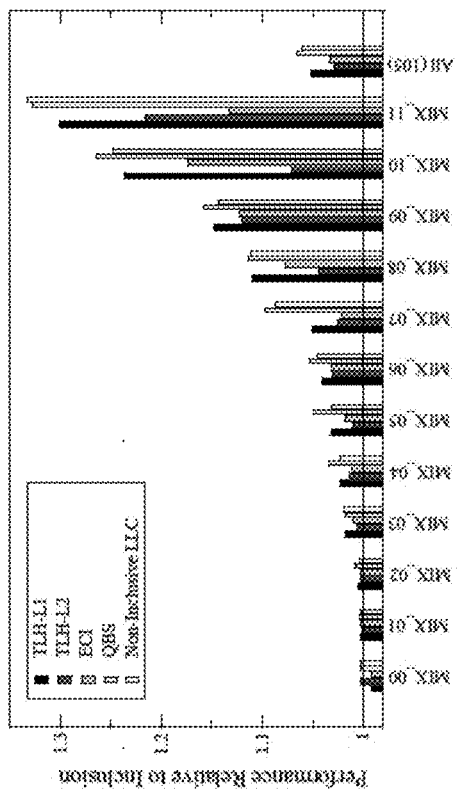

FIG. 9a summarizes the performance of the TLA mechanisms proposed in this paper compared to the baseline inclusive cache. The figure shows that QBS performs similar to a non-inclusive cache hierarchy. To ensure that the performance benefits of the TLA mechanisms are only from reducing inclusion victims, the performance impact of these mechanisms was also evaluated on a non-inclusive cache (where inclusion victims do not exist). If there were some other benefits besides reducing inclusion victims, benefits from TLA mechanisms on a non-inclusive cache would be expected.

FIG. 9b summarizes the performance of the TLA mechanisms normalized to the performance of a non-inclusive LLC. The results show that TLA cache management policies improve the performance of a non-inclusive cache by only 0.4-1.2%. These results show that the TLA mechanisms provide insignificant improvement in performance for a noninclusive cache. However, they significantly improve inclusive cache performance. Thus, the first order benefits of a non-inclusive cache are primarily from avoiding inclusion victims. Finally, the figure shows that on average, an exclusive cache hierarchy has 2.5% better performance than a non-inclusive cache hierarchy. This shows that eliminating inclusion victims can significantly bridge the performance gap between inclusive and exclusive cache hierarchies. Once inclusion victims are eliminated, the remaining gap between inclusive and exclusive caches is primarily due to the extra capacity in the hierarchy.

F. Scalability to Different Cache Ratios

Figure 10:
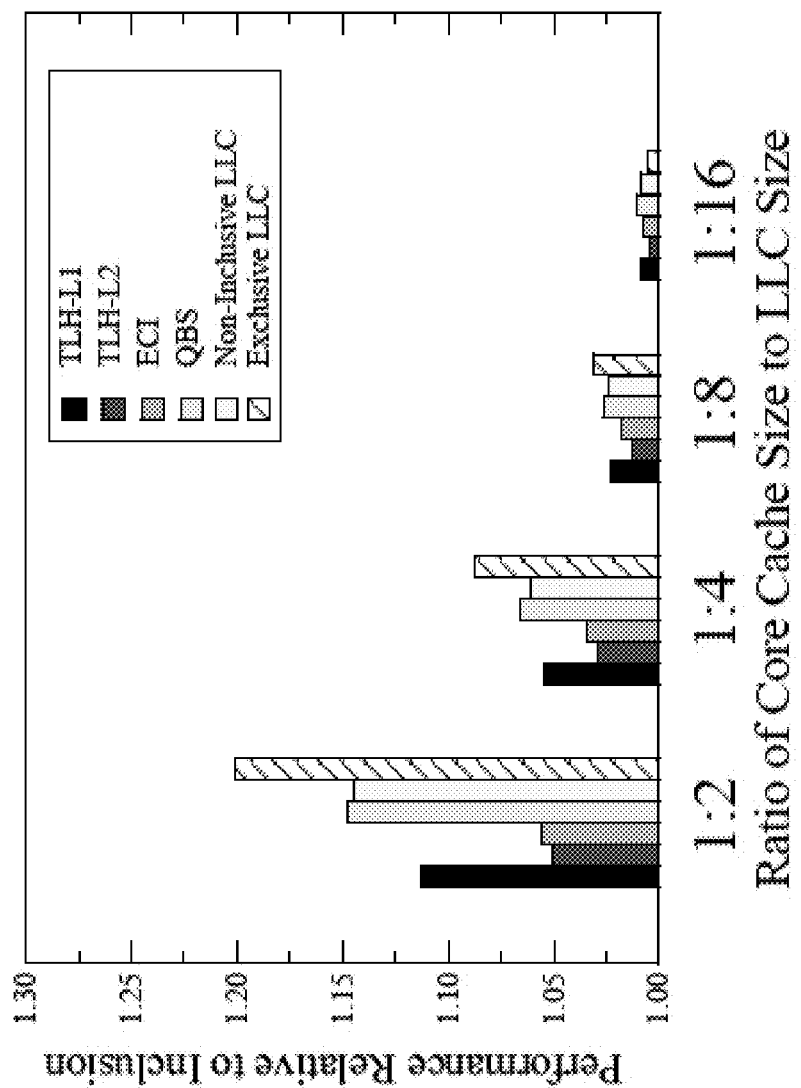
FIG. 10 illustrates scalability of TLA policies to different cache ratios.

FIG. 10 presents the scalability of the proposed TLA mechanisms for different core cache to LLC ratios. The figure shows the performance of the TLA mechanisms for a 1 MB, 2 MB, 4 MB, and 8 MB LLC. The L2 to LLC ratios for these cache sizes are 1:2, 1:4, 1:8, and 1:16. In general, reducing the LLC size while keeping the core caches constant requires better LLC management. When the LLC is not significantly larger than the core caches, exclusive or non-inclusive caches significantly improve performance compared to the baseline inclusive caches. Both TLH-L1 and QBS significantly bridge the gap between inclusive and non-inclusive caches. TLH-L1 does not perform as well as QBS for the 1:2 ratio because "hot" lines serviced by the L2 cache were suffering from inclusion victims. TLH-L1-L2 performs similar to QBS for this configuration. Unlike TLHs (which are impractical due to the required amount of bandwidth), a low bandwidth solution such as QBS matches noninclusive cache performance for the different cache ratios.

G. Scalability to Different Number of Cores

Figure 11:
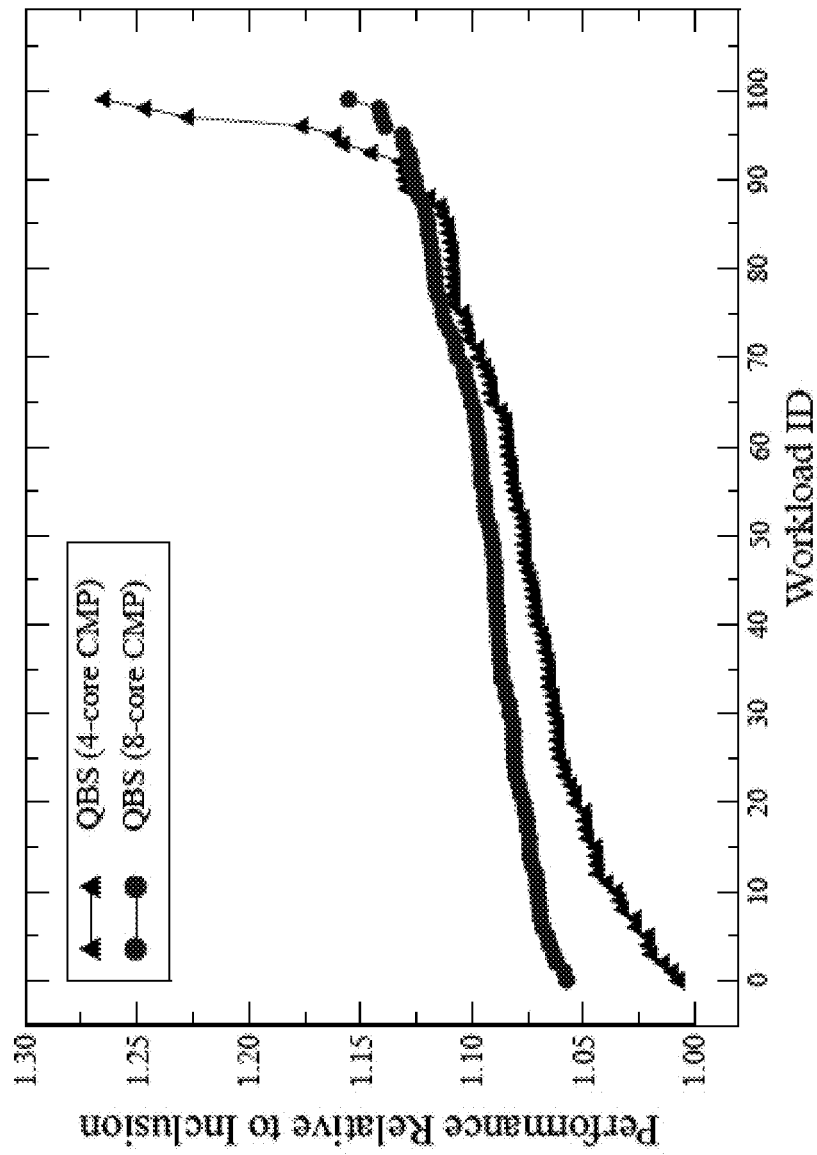
FIG. 11 illustrates QBS performance with increasing core count.

FIG. 11 presents the performance of QBS when the total number of cores in the CMP are increased. We created 100 4-core and 8-core workload mixes and evaluated QBS performance on a CMP where the ratio of the core cache to LLC is maintained at 1:4. The 4-core CMP has a 4 MB LLC while the 8-core CMP has an 8 MB LLC. The results show that QBS improves performance of a 4-core CMP with an inclusive cache by 8.1% on average. Non-inclusive and exclusive cache hierarchies for the 4-core CMP improve performance by 8.3% and 11.4% respectively. Similarly, for an 8-core CMP, QBS improves average performance by 9.5% while non-inclusive and exclusive LLCs improve performance by 10.1% and 13.6% respectively. These results show that QBS scales with increasing number of cores and consistently bridges more than 95% of the performance gap between inclusive and non-inclusive cache hierarchies.

H. Hardware Overhead

The proposed TLA policies require very little hardware overhead. They all use existing data paths in the system to allow the LLC to become aware of the temporal locality of lines in the core caches. TLH requires a new message class that does not return data but merely updates the LLC replacement state. Since TLH is not scalable due to large bandwidth requirements, TLHs are not a practical solution—especially since ECI and QBS serve as alternative low bandwidth solutions. ECI requires additional logic to preselect the next victim in the cache and invalidate it from the core caches. Similarly, QBS uses the existing data path to determine whether or not a cache line can be evicted from the LLC. The additional logic required is a state-machine to send queries to the core caches and responses to the LLC. As the number of HW-threads on-chip continue to increase, both QBS and ECI are scalable solutions that are effective for any inclusive cache hierarchy organization.

VI. Exemplary Processor and System Architectures

The underlying principles of the invention may be implemented on various different processor architectures including the Core i3, i5, and/or i7 processors designed by Intel or on various low power System-on-a-Chip (SoC) architectures used in smartphones and/or other portable computing devices.

Figure 12:
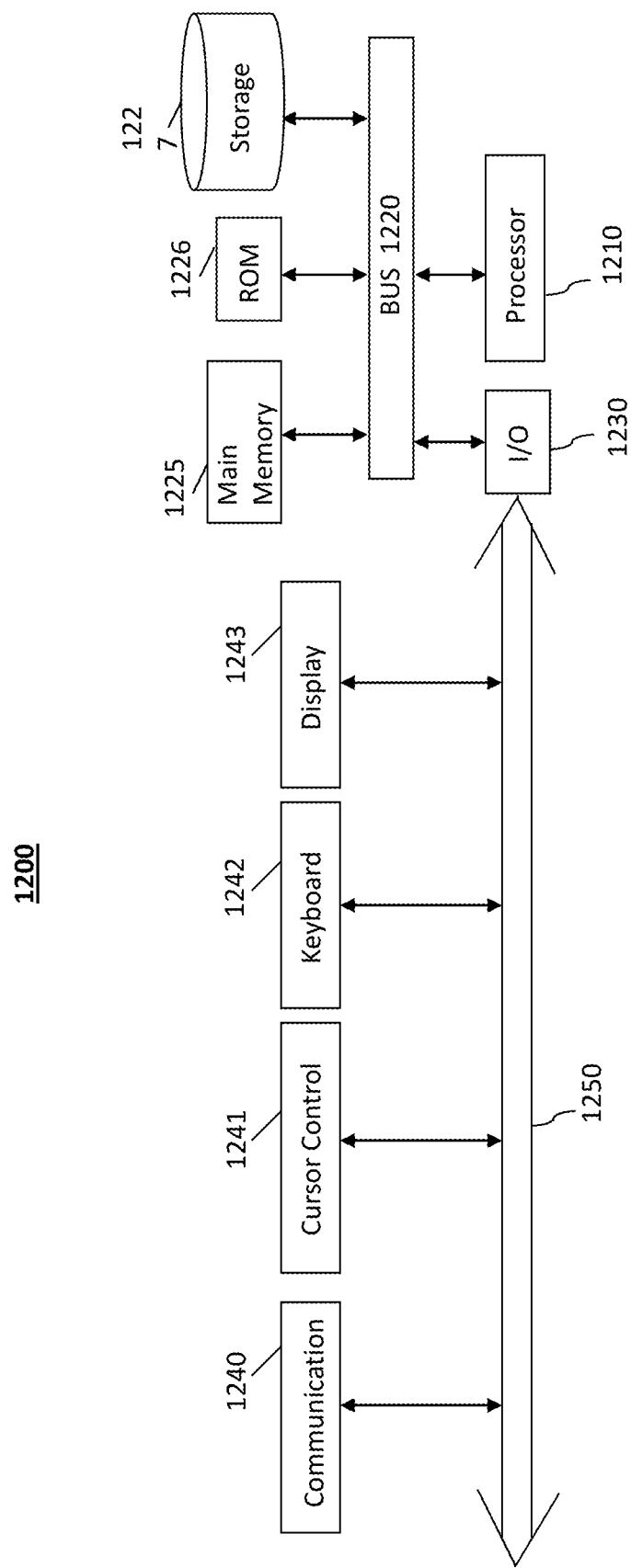
FIG. 12 illustrates an exemplary computer system on which embodiments of the invention may be implemented.

FIG. 12 illustrates an exemplary computer system 1200 upon which embodiments of the invention may be implemented. The computer system 1200 comprises a system bus 1220 for communicating information, and a processor 1210 coupled to bus 1220 for processing information. Computer system 800 further comprises a random access memory (RAM) or other dynamic storage device 1225 (referred to herein as main memory), coupled to bus 1220 for storing information and instructions to be executed by processor 1210. Main memory 1225 also may be used for storing temporary variables or other intermediate information during execution of instructions by processor 810. Computer system 1200 also may include a read only memory (ROM) and/or other static storage device 1226 coupled to bus 1220 for storing static information and instructions used by processor 1210.

A data storage device 1227 such as a magnetic disk or optical disc and its corresponding drive may also be coupled to computer system 1200 for storing information and instructions. The computer system 1200 can also be coupled to a second I/O bus 1250 via an I/O interface 1230. A plurality of I/O devices may be coupled to I/O bus 1250, including a display device 1243, an input device (e.g., an alphanumeric input device 1242 and/or a cursor control device 1241).

The communication device 240 is used for accessing other computers (servers or clients) via a network, and uploading/downloading various types of data. The communication device 240 may comprise a modem, a network interface card, or other well known interface device, such as those used for coupling to Ethernet, token ring, or other types of networks.

Figure 13:
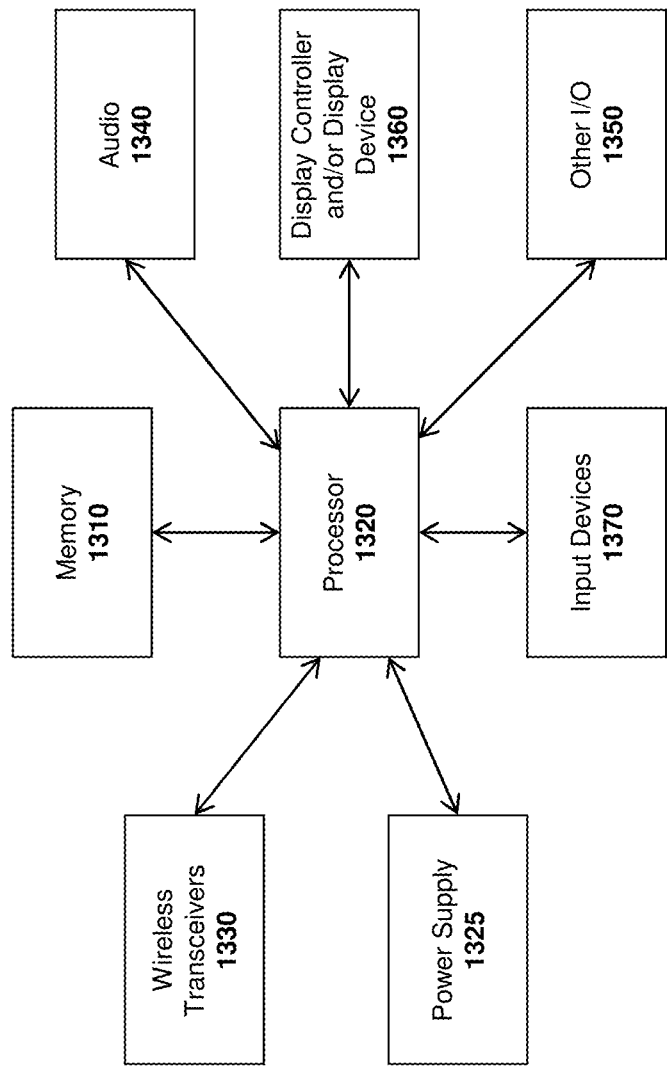
FIG. 13 illustrates another exemplary computer system on which embodiments of the invention may be implemented.

FIG. 13 is a block diagram illustrating another exemplary data processing system which may be used in some embodiments of the invention. For example, the data processing system 1300 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1300 may be a network computer or an embedded processing device within another device.

According to one embodiment of the invention, the exemplary architecture of the data processing system 1300 may used for the mobile devices described above. The data processing system 1300 includes the processing system 1320, which may include one or more microprocessors and/or a system on an integrated circuit. The processing system 1320 is coupled with a memory 1310, a power supply 1325 (which includes one or more batteries) an audio input/output 1340, a display controller and display device 1360, optional input/output 1350, input device(s) 1370, and wireless transceiver(s) 1330. It will be appreciated that additional components, not shown in FIG. 13, may also be a part of the data processing system 1300 in certain embodiments of the invention, and in certain embodiments of the invention fewer components than shown in FIG. 13 may be used. In addition, it will be appreciated that one or more buses, not shown in FIG. 13, may be used to interconnect the various components as is well known in the art.

The memory 1310 may store data and/or programs for execution by the data processing system 1300. The audio input/output 1340 may include a microphone and/or a speaker to, for example, play music and/or provide telephony functionality through the speaker and microphone. The display controller and display device 1360 may include a graphical user interface (GUI). The wireless (e.g., RF) transceivers 1330 (e.g., a WiFi transceiver, an infrared transceiver, a Bluetooth transceiver, a wireless cellular telephony transceiver, etc.) may be used to communicate with other data processing systems. The one or more input devices 1370 allow a user to provide input to the system. These input devices may be a keypad, keyboard, touch panel, multi touch panel, etc. The optional other input/output 1350 may be a connector for a dock.

VII. Summary

Inclusive caches are desirable because they simplify cache coherence. However, inclusive caches limit performance due to inclusion victims. In contrast, non-inclusive caches eliminate inclusion victims but come at the expense of increasing coherence complexity. The embodiments of the invention described herein improve inclusive cache performance by making these contributions:

1. A better managed inclusive cache provides equal or better performance than a non-inclusive cache. Specifically, it has been shown that the bulk of non-inclusive (and exclusive) cache performance over inclusive caches is due to avoiding inclusion victims and not the extra caching capacity in the hierarchy. Inclusion victims occur because an inclusive LLC is unaware of the temporal locality of "hot" lines in the core caches.

2. Temporal Locality Hints (TLH) are proposed as a mechanism to convey the temporal locality of lines referenced in the core caches to the LLC. TLHs sent by the L1 cache significantly reduce the number of inclusion victims. TLHs, however, significantly increase on-chip bandwidth.

3. Early Core Invalidation (ECI) is proposed as a low bandwidth technique used by the LLC to derive a line's temporal locality. Unlike TLHs, ECI is only triggered on LLC misses. ECI selects the next potential LLC victim and invalidates that line from the core caches while retaining it in the LLC. ECI employs the heuristic that if the next potential LLC victim line is "hot", it will be serviced by the LLC (instead of the core caches) on the subsequent access causing an LLC replacement state update. However, ECI limits performance when the subsequent access occurs after a miss (to the same set).

4. Query Based Selection (QBS) is proposed as an alternative to ECI. QBS employs the heuristic that the core caches are best suited to inform the LLC on the temporal locality of a line. Lines resident in the core caches have high temporal locality and should not be evicted from the LLC. In doing so, QBS allows inclusive caches to approach the performance of non-inclusive caches.

For the baseline 2-core CMP, it has been shown that TLHs issued from the L1 cache bridge 85% of the gap between inclusive and non-inclusive caches. ECI bridges 55% of the gap and QBS performs similar to non-inclusive caches. These studies show that when non-inclusion must be enforced due to target core cache to LLC size ratios, (e.g. 1:2 or 1:4), the QBS technique allows chip designers to maintain the coherence benefits of inclusion while performing similar to a non-inclusive cache.

This is especially important since chip designers today are willing to sacrifice coherence benefits for the performance improvement of non-inclusive LLCs "AMD Athlon Processor and AMD Duron Processor with full-speed ondie L2 cache," June 2000. Using QBS, we report 10-33% performance improvement for 25 of the 105 workloads on 2, 4 and 8 core systems with a 1:4 hierarchy and 16% performance improvement on systems with a 1:2 hierarchy. As the number of cores sharing an LLC increases, cache contention increases and addressing inclusion victims becomes a growing concern. ECI and QBS are scalable and perform better with increasing core counts. Both introduce extra messages into the system that do not require significant additional bandwidth or additional hardware structures.

Other embodiments of the invention may be implemented on cellular phones and pagers (e.g., in which the software is embedded in a microchip), handheld computing devices (e.g., personal digital assistants, smartphones), and/or touch-tone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for improving cache performance in a computer system having a multi-level cache hierarchy comprising:
    selecting a first line in a cache at level N for potential eviction in response to a cache line miss at level N;
    querying a cache at level M in the hierarchy to determine whether the first cache line is resident in the cache at level M, wherein M<N;
    in response to receiving an indication that the first cache line is not resident at level M, then evicting the first cache line from the cache at level N; and
    in response to receiving an indication that the first cache line is resident at level M, then retaining the first cache line and choosing a second cache line for potential eviction.

2. The method as in claim 1 wherein the first cache line is selected for potential eviction based on a least recently used (LRU) cache management policy.

3. The method as in claim 2 wherein in response to receiving an indication that the first cache line is resident at level M, then updating a status of the first cache line to most recently used (MRU) within the cache at level N.

4. The method as in claim 3 wherein the second cache line is designated the least recently used cache line after the first cache line is updated to a most recently used status.

5. The method as in claim 1 wherein the cache at level M comprises a level 1 (L1) cache in a core of a microprocessor.

6. The method as in claim 5 wherein the cache line at level N comprises a level 2 (L2) cache or another lower-level cache.

7. The method as in claim 1 wherein the first line is selected in the cache at level N for potential eviction in response to a cache miss at level N, the method further comprising:
    updating the cache at level N with a cache line containing data associated with the cache miss read from memory and/or from a cache at a lower level than level N.

8. The method as in claim 4 further comprising:
    querying the cache at level M in the hierarchy to determine whether the second cache line is resident in the cache at level M;
    in response to receiving an indication that the second cache line is not resident at level M, then evicting the second cache line from the cache at level N; and
    in response to receiving an indication that the second cache line is resident at level M, then retaining the second cache line and choosing a third cache line for potential eviction.

9. The method as in claim 8 wherein a maximum number of queries to the cache at level M is designated, the method further comprising evicting the third cache line if the designated maximum number of queries has been reached.

10. An apparatus for improving cache performance in a computer system having a multi-level cache hierarchy comprising:
    a cache at level N;
    a cache at level M, wherein M<N; and
    a cache controller to perform the operations of:
        selecting a first line in the cache at level N for potential eviction in response to a cache line miss at level N;
        querying a cache at level M in the hierarchy to determine whether the first cache line is resident in the cache at level M, wherein M<N;
        in response to receiving an indication that the first cache line is not resident at level M, then evicting the first cache line from the cache at level N; and
        in response to receiving an indication that the first cache line is resident at level M, then retaining the first cache line and choosing a second cache line for potential eviction.

11. The apparatus as in claim 10 wherein the first cache line is selected for potential eviction based on a least recently used (LRU) cache management policy.

12. The apparatus as in claim 11 wherein in response to receiving an indication that the first cache line is resident at level M, then updating a status of the first cache line to most recently used (MRU) within the cache at level N.

13. The apparatus as in claim 12 wherein the second cache line is designated the least recently used cache line after the first cache line is updated to a most recently used status.

14. The apparatus as in claim 10 wherein the cache at level M comprises a level 1 (L1) cache in a core of a microprocessor.

15. The apparatus as in claim 14 wherein the cache line at level N comprises a level 2 (L2) cache or another lower-level cache.

16. The apparatus as in claim 10 wherein the first line is selected in the cache at level N for potential eviction in response to a cache miss at level N, wherein the cache controller performs the additional operations of:
    updating the cache at level N with a cache line containing data associated with the cache miss read from memory and/or from a cache at a lower level than level N.

17. The apparatus as in claim 13 wherein the cache controller performs the additional operations of:
    querying the cache at level M in the hierarchy to determine whether the second cache line is resident in the cache at level M;
    in response to receiving an indication that the second cache line is not resident at level M, then evicting the second cache line from the cache at level N; and
    in response to receiving an indication that the second cache line is resident at level M, then retaining the second cache line and choosing a third cache line for potential eviction.

18. The apparatus as in claim 17 wherein a maximum number of queries to the cache at level M is designated, wherein the cache controller performs the additional operations of evicting the third cache line if the designated maximum number of queries has been reached.

19. A computer system comprising:
    a display device;
    a memory for storing instructions; and
    a processor for processing the instructions, the processor including an apparatus for improving cache performance with a multi-level cache hierarchy comprising:
        a cache at level N;
        a cache at level M, wherein M<N;

a cache controller to perform the operations of:
  selecting a first line in the cache at level N for potential eviction in response to a cache line miss at level N;
  querying a cache at level M in the hierarchy to determine whether the first cache line is resident in the cache at level M, wherein M<N;
  in response to receiving an indication that the first cache line is not resident at level M, then evicting the first cache line from the cache at level N; and
  in response to receiving an indication that the first cache line is resident at level M, then retaining the first cache line and choosing a second cache line for potential eviction.

* * * * *